Nov. 17, 1970 R. W. SIMPSON ET AL 3,540,088
CLAMPING DEVICE

Filed July 1, 1968 3 Sheets-Sheet 1

Inventors
RICHARD W. SIMPSON
CARL R. HART
by JEFFERS & YOUNG
Attorneys

Nov. 17, 1970    R. W. SIMPSON ET AL    3,540,088
CLAMPING DEVICE

Filed July 1, 1968    3 Sheets-Sheet 2

Inventors
RICHARD W. SIMPSON
CARL R. HART
by JEFFERS & YOUNG
Attorneys

Inventors
RICHARD W. SIMPSON
CARL R. HART
by JEFFERS & YOUNG
Attorneys

United States Patent Office 3,540,088
Patented Nov. 17, 1970

1

3,540,088
CLAMPING DEVICE
Richard W. Simpson, Fort Wayne, and Carl R. Hart, New Haven, Ind., assignors to The Magnavox Company, Fort Wayne, Ind., a corporation of Delaware
Filed July 1, 1968, Ser. No. 741,683
Int. Cl. A44b 17/00; F16f 13/00
U.S. Cl. 24—221
18 Claims

ABSTRACT OF THE DISCLOSURE

A phonograph turntable plate is secured to a base plate in either a clamped position or in a free but retained position by a clamping device. The clamping device has a shank formed with an actuator, a clamping surface, and a retaining surface. The actuator rests against the turntable plate, and the clamping surface rests against the base plate to clamp the two plates, or the retaining surface is positioned adjacent the base plate to retain the two plates.

BACKGROUND OF THE INVENTION

Our invention relates to clamping device for two plates, and particularly to such a clamping device that can selectively clamp the plates together firmly, or that can selectively hold the plates in a free, but retained relation.

Phonograph turntables, and particularly automatic phonograph record changers, are normally mounted on a turntable or unit plate which is suspended on springs above a fixed base plate or motorboard. The spring suspension is provided in order to eliminate vibration and shock to the unit plate. Such vibration and shock may damage the phonograph turntable or pickup, or may cause the phonograph pickup needle to slide across a record. In any case, such vibration and shock may cause injury to the record, or the pickup, or the pickup needle. When the unit plate is suspended on springs, it is desirable that the unit plate be retained so that it will not vibrate off of or move too far away from the motorboard. In addition, when the phonograph is transported or shipped, it is desirable that the unit plate be securely clamped to the motorboard so that the turntable mechanism will not be injured.

Accordingly, an object of our invention is to provide a new and improved clamping device for phonograph turntables.

Another object of our invention is to provide a new and improved clamping device that can be easily and quickly positioned in a firm clamping position or in a relatively free retaining or free floating position.

Another object of our invention is to provide an improved clamping device for a phonograph unit plate and motorboard so that the unit plate can be either selectively clamped to the motorboard or can be retained on, but relatively freely movable with respect to, the motorboard.

Another object of our invention is to provide a new and improved phonograph unit plate clamping device that is simple in construction, that is easily and inexpensively manufactured, and that is easily and reliably operated.

While phonograph clamping devices have been previously provided, such previous clamping devices required

2 that a repairman or serviceman be able to reach beneath the motorboard to operate the clamping devices in order to service the phonograph. At best, such an operation is time consuming. If there is little clearance or space beneath the motorboard, as is typical in a console phonograph, the operation is not only time consuming, but is also tedious.

Accordingly, another object of our invention is to provide a clamping device that can be easily installed on a phonograph before shipment, that does not interfere with the shipping arrangement, and that can be used without modification or change after shipment.

Another object of our invention is to provide a clamping device that can be installed on or removed from a phonograph from above, without access to the space beneath the phonograph motorboard being required.

SUMMARY OF THE INVENTION

Briefly, these and other objects are achieved in accordance with our invention by a clamping device having an elongated shank extending along a longitudinal axis. An actuator is attached to the top of the shank. The actuator has a surface that faces the bottom of the shank for contacting the phonograph unit plate. A clamping member is attached between the top and bottom of the shank. The clamping member has a clamping surface that faces the top for contacting the phonograph motorboard. A retaining member is attached to the bottom of the shank. The retaining member has a retaining surface that faces the top for also contacting the phonograph motorboard. The actuator surface, the clamping surface, and the retaining surface are substantially parallel. The unit plate and the motorboard are provided with slots, and the clamping device positioned in these slots. The unit plate and the motorboard may be clamped together between the actuator surface and the clamping surface, or may be freely retained between the actuator surface and the retaining surface. The particular surface utilized may be easily selected by movement of the actuator by a person's finger. The clamping device is a simple one piece construction, but is reliable and easy to install and operate.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

DESCRIPTION OF THE PREFERRED EMBODIMENT

Figure 1:
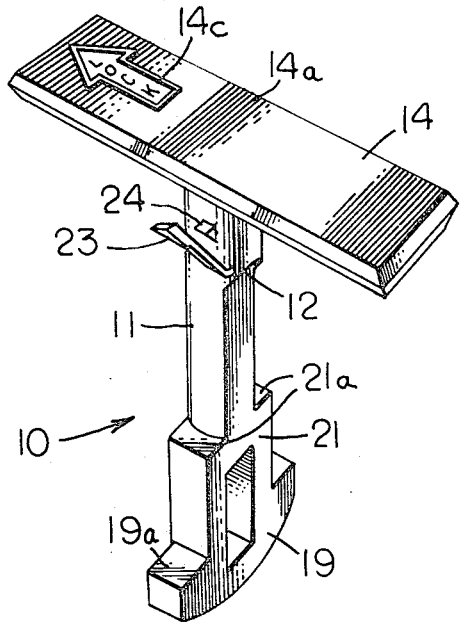
FIG. 1 shows a perspective view of a preferred embodiment of our clamping device.
Figure 2:
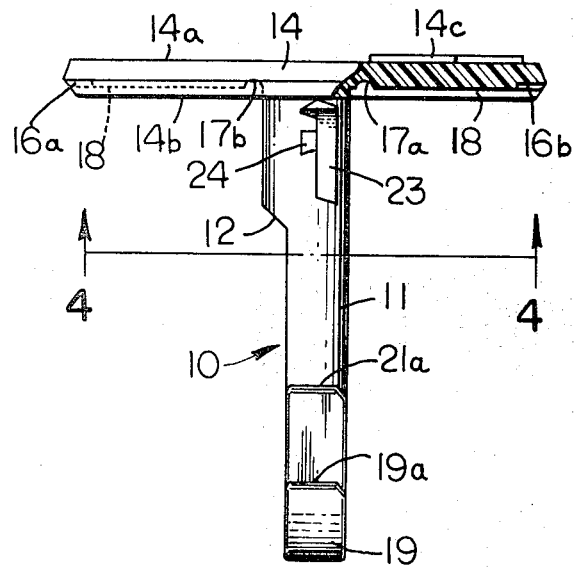
FIG. 2 shows a side elevation view of our clamping device of FIG. 1.
Figure 3:
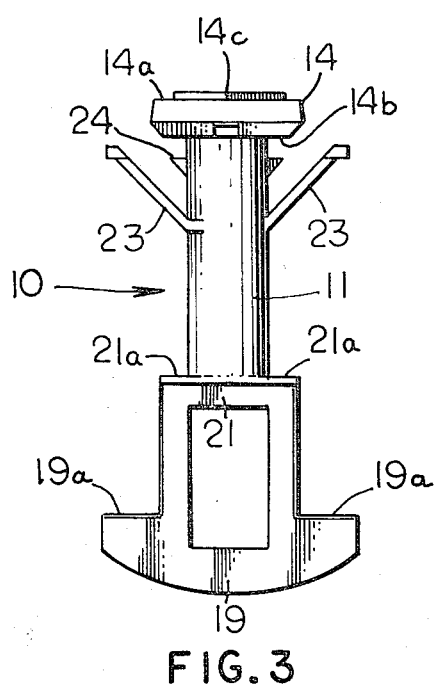
FIG. 3 shows an end elevation view of our clamping device of FIG. 1.
Figure 4:
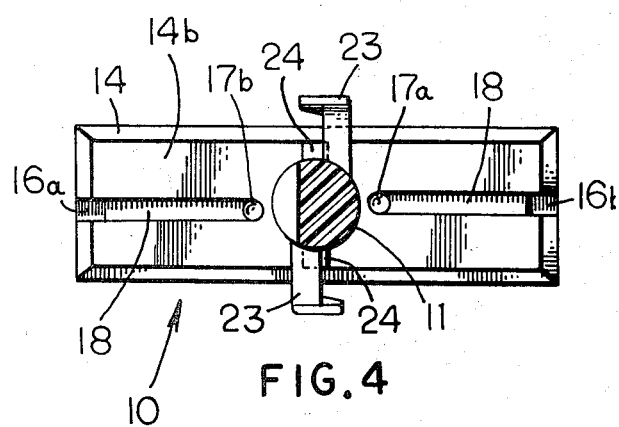
FIG. 4 shows a transverse cross-sectional view of our clamping device taken along the line 4—4 in FIG. 2.

With reference to FIGS. 1 through 4, we have shown various views of a clamping device 10 in accordance with our invention. We prefer that the clamping device 10 be constructed of strong, somewhat resilient plastic material such as Delrin, although the device 10 may be constructed of other materials such as metal. The clamping device 10 comprises a generally cylindrical, elongated shank 11 which may be provided with a bevel or taper 12 to save material. For purposes of description, the shank 11 may be considered to have a longitudinal axis. An actuator 14 is attached to the top of the shank 11. The actuator 14 is generally rectangular and flat. Its upper surface 14a is preferably serrated or grooved to provide friction for finger operation, and is also provided with a lock arrow 14c for purposes that will be explained. The actuator 14 has a lower surface 14b which engages the upper surface of a unit plate. The lower surface 14b is provided with two square or rectangularly shaped depressions 16a, 16b at its ends, and with two circular or hemispherically shaped depressions 17a, 17b near its center, as shown in FIGS. 2 and 4. The depressions 16a, 17b and the depressions 16b, 17a are respectively joined by guiding grooves 18 which are more shallow than the depressions 16a, 16b, 17a, 17b. The depressions 16a, 16b, 17a, 17b engage projections on the upper surface of the unit plate to provide a detent or locking action as will be explained. The depressions 16a, 17a or the depressions 16b, 17b are operative at any one time, and so the distance between the depressions 16a, 17a is equal to or the same as the distance between the depressions 16b, 17b. The bottom of the shank 11 is provided with a retaining member 19 which is preferably mounted on two support legs as shown. The retaining member 19 provides two retaining surfaces 19a which extend outwardly in opposite directions in a plane that is substantially perpendicular to the longitudinal axis of the shank 11. The shank 11 is provided with a clamping member 21 between its top and bottom. The clamping member 21 is shaped to provide two clamping surfaces 21a which also extend outwardly in opposite directions in a plane that is substantially perpendicular to the longitudinal axis of the shank 11. The retaining surfaces 19a and the clamping surfaces 21a are preferably in alignment. That is, the clamping surfaces 21a are preferably above the retaining surfaces 19a as seen in FIG. 3. However, the retaining surfaces 19a and the clamping surfaces 21a may extend at some angle relative to each other. The retaining surfaces 19a extend outward beyond the clamping surfaces 21a as seen in FIG. 3. Finally, the shank 11 is provided with two resilient clamping arms 23 which extend upward toward the lower surface 14b of the actuator 14. The ends of the arms 23 serve to hold the clamping device 10 in position on the unit plate between the ends of the arms 23 and the lower surface 14b of the actuator 14. The axis or direction of the retaining surfaces 19a, the clamping surfaces 21a, and the arms 23 are preferably substantially perpendicular to the longitudinal axis or direction of the actuator 14. Two stops 24 are also provided on the shank 11 to limit the distance that the arms 23 can bend if the actuator 14 is lifted, so that the arms 23 will not be broken.

Figure 5:
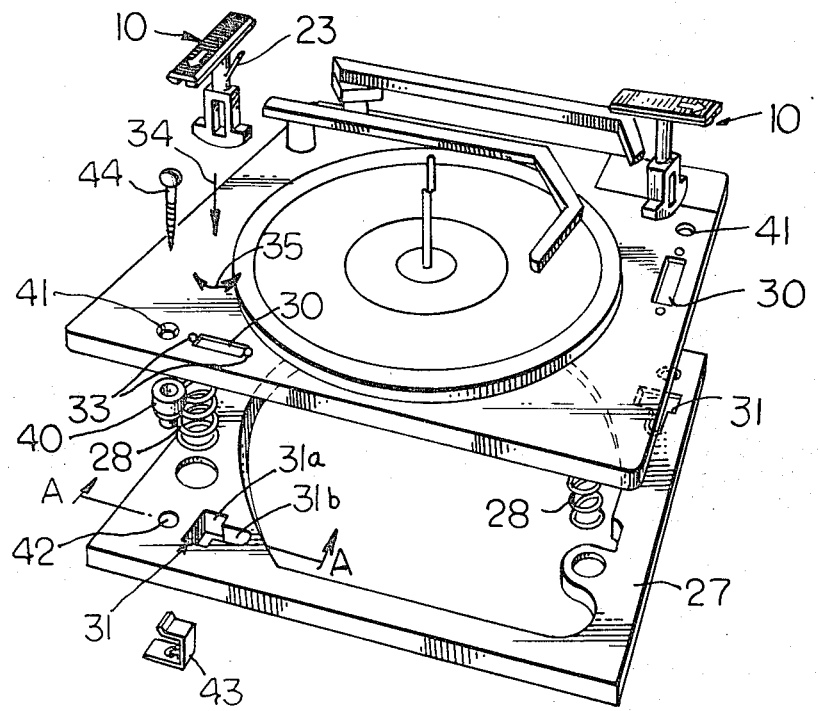
FIG. 5 shows an exploded perspective view of a phonograph adapted to use our clamping device.

In FIG. 5, we have shown an exploded view of a phonograph or record player which is adapted to use our clamping device 10. The phonograph or record player shown in FIG. 5 is representative, and comprises an upper or unit plate 26 which is mounted above a motorboard 27 on a plurality of support springs 28. The support springs 28 are usually attached to the lower surface of the unit plate 26 and fit, without attachment, in depressions in the upper surface of the motorboard 27. When the phonograph is to be carried, moved, or shipped, it is desirable that the unit plate 26 be firmly clamped to the motorboard 27 to minimize vibration and relative motion. However, when the phonograph is to be used or played, it is desirable that the unit plate 26 be freely supported by the support springs 28, but retained to or limited in its travel or motion from the motorboard 27. Our clamping device 10 permits the unit plate 26 to be firmly clamped to the motorboard 27, or permits the unit plate 26 to be freely supported by the support springs 28 but retained to or limited in the distance it can move from the motorboard 27. In order to receive our clamping device 10, the unit plate 26 is provided with a rectangularly shaped slot or opening 30. A projection 33 is positioned at each end of the slot or opening 30. These two projections 33 are spaced by a distance equal to the distance between the depressions 16a, 17a or the distance between the depressions 16b, 17b. These projections 33 are arranged to fit into the depressions 16a, 17a, 16b, 17b to provide the detent or locking action mentioned above. The motorboard 27 is provided with a generally T-shaped slot or opening 31 having a wide portion 31a and a narrow portion 31b. The clamping device 10 is designed so that the retaining member 19 is wider than the wide portion 31a, and so that the clamping member 21 is wider than the narrow portion 31b' When the phonograph is assembled, the springs 28 are attached to the unit plate 26 and positioned in their respective depressions or recesses in the motorboard 27. The slot or opening 31 is correspondingly positioned with respect to the slot or opening 30. That is, the slots or openings 30, 31 are positioned in vertical registration. When the clamping device 10 is placed on the assembled phonograph, it is inserted downward through the slot or opening 30 and through the slot or opening 31 as indicated by the arrow 34, and then rotated in either a clockwise or a counterclockwise direction as indicated by the arrow 35. After the clamping device 10 is positioned in its proper location, the actuator 14 extends in the same direction as the slot 30, and the retaining member 19 and the clamping member 21 are transverse or at right angles to the slot or opening 30. Also, the actuator 14 is on top of the unit plate 26, and either its retaining member 19 or its retaining member 19 and the clamping member 21 are beneath the motorboard 27. The arms 23 and stops 24 are beneath the unit plate 26 to retain the clamping device 10.

Figure 6:
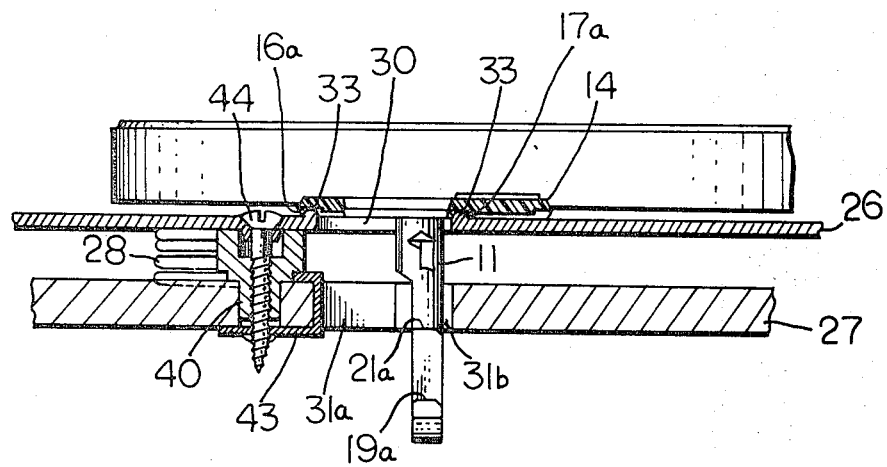
FIG. 6 shows a cross-sectional view taken along the line A—A in FIG. 5 with the phonograph assembled and arranged for shipment with our clamping device.

When the phonograph is first manufactured and prepared for shipment, it is not only clamped or held firmly by our clamping device 10 but it may also be held or secured by additional means. These additional means include one or more spacers 40, each of which is positioned beneath a hole 41 in the unit plate 26 and partially in a hole 42 in the motorboard 27. The unit plate 26 is held against lateral movement by the formed piece beneath the hole 41 in the unit plate 26 fitting in the upper part of the spacer 40 and by the lower part of the spacer 40 fitting in the hole 42 in the motorboard 27. A U-shaped speed nut or comparable device 43 is slipped on the motorboard 27 at the wide portion 31a of the T-shaped slot or opening 31. Then, a self-tapping or sheet metal screw 44 is inserted through the hole 41, the spacer 40, the hole 42, and threaded into the speed nut 43. This holds the unit plate 26 firmly to the motorboard 27 as illustrated in FIG. 6. Our clamping device 10 may be inserted either before or after these additional shipping means are installed, depending upon the desired assembly techniques used. When the phonograph is shipped, our clamping device 10 is moved to the right as viewed in FIG. 6 (that is, in the direction of the lock arrow 14c) so that the clamping surfaces 21a are adjacent the narrow portion 31b of the T-shaped slot or opening, and so that these clamping surfaces 21a engage the lower surface of the motorboard 27 and help hold the unit plate 26 and the motorboard 27 together.

When the phonograph is to be used by a purchaser or other person, the screw 44 is removed. However, the spacer 40 and the speed nut 43 are retained. In particular, the spacer 40 is retained by its lower end that fits in the hole 42 in the motorboard 27. Then, the phonograph may be used with the clamping device 10 operated to the retaining position for playing, or to the clamping position for holding the unit plate 26 firmly to the motorboard 27.

Figure 7:
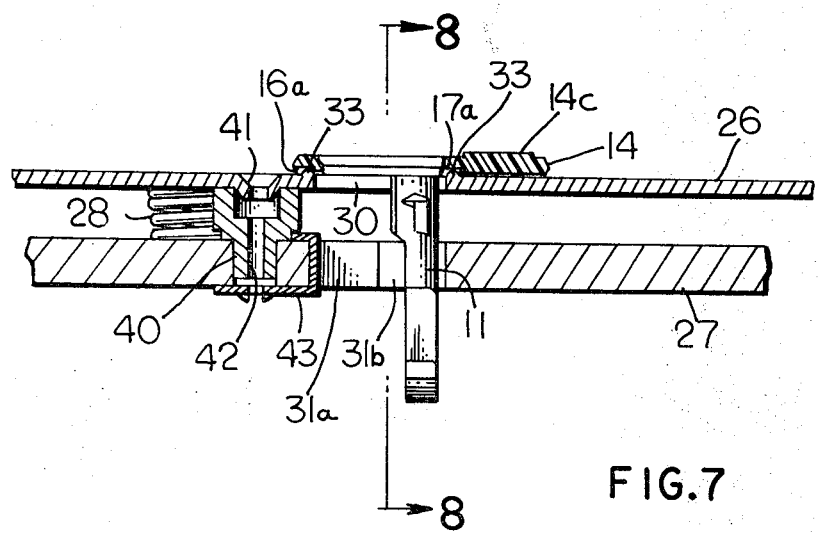
FIG. 7 shows a cross-sectional view taken along the line A—A in FIG. 5 with the phonograph assembled and clamped by our clamping device.
Figure 8:
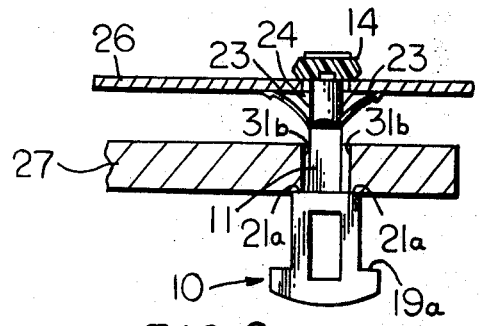
FIG. 8 shows a cross-sectional view taken along the line 8—8 in FIG. 7.

FIGS. 7 and 8 show views of our clamping device 10 in the clamping position for carrying the phonograph. FIG. 7 is taken along the line A—A in FIG. 5, and FIG. 8 is taken along the line 8—8 in FIG. 7. In FIG. 7, it will be seen that the clamping device 10 is positioned or moved to the right in the direction of the lock arrow 14c on top of the actuator 14. In this position, the depressions 16a, 17a are engaged by the projections 33, and the clamping surfaces 21a engage the lower surface of the motorboard 27 adjacent the narrow portion 31b of the T-shaped slot or opening 31. The unit plate 26 and the motorboard 27 are relatively close together and the spring 28 is almost fully compressed. Hence, the unit plate 26 and the motorboard 27 are firmly positioned by the spacer 40, and held by the clamping device 10. FIG. 8 shows how the clamping surfaces 21a engage the lower surfaces of the motorboard 27.

Figure 9:
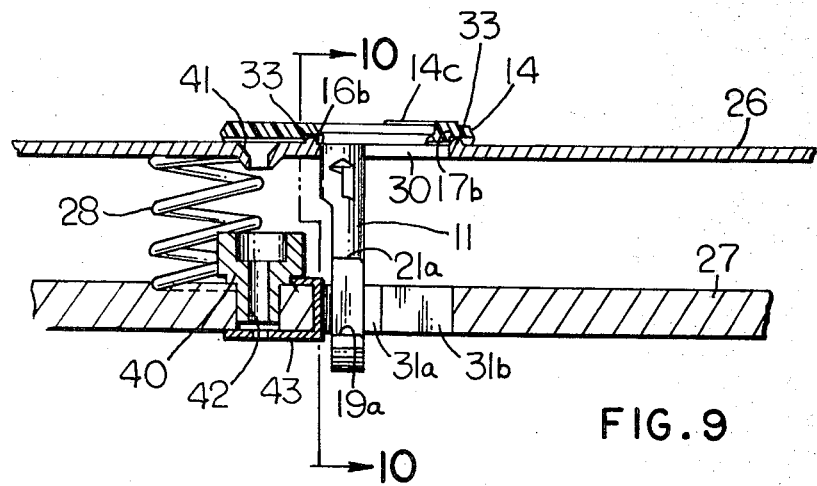
FIG. 9 shows a cross-sectional view taken along the line A—A in FIG. 5 with the phonograph in a relatively free floating position but retained by our clamping device.
Figure 10:
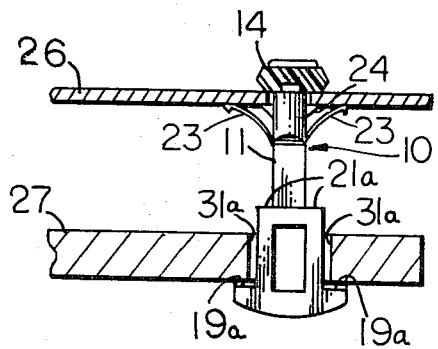
FIG. 10 shows a cross-sectional view taken along the line 10—10 in FIG. 9.

When the phonograph is to be used or played, the clamping device 10 is moved to the left as viewed in FIG. 7. When the clamping device 10 is moved to the left, the clamping surfaces 21a are moved adjacent the wide portion 31a of the T-shaped slot or opening 31. This permits the clamping surfaces 21a to pass through the wide portion 31a of the slot 31. As this occurs, the spring 28 expands to separate the unit plate 26 and the motorboard 27, and to cause the clamping device 10 to be moved upward as shown in FIGS. 9 and 10. FIG. 9 is taken along the line A—A in FIG. 5, and FIG. 10 is taken along the line 10—10 in FIG. 9. In FIG. 9, it will be seen that the depressions 16b, 17b now engage the projections 33, and that the clamping device 10 is positioned in the wide portion 31a of the T-shaped slot or opening 31. It will also be seen that the actuator 14 covers the hole 41 in the unit plate 26. FIG. 10 shows how the retaining surfaces 19a are just beneath the lower surfaces of the motorboard 27 so that the springs 28 provide the major support for the unit plate 26. However, the retaining surfaces 19a limit the movement of the unit plate 26 with respect to the motorboard 27, so that an inexperienced person cannot inadvertently get access to the phonograph mechanism and hazardous electrical connections beneath the unit plate 26.

When the unit plate 26 is to be clamped to the motorboard 27 again, the clamping device 10 is moved in the direction of the lock arrow 14c, or to the right as viewed in FIG. 9. As the clamping device 10 is moved, it is also pushed downward to move the unit plate 26 toward the motor board 27 so that the clamping surfaces 21a may pass beneath the lower surfaces of the motorboard 27 and clamp the unit plate 26 to the motorboard 27 as shown in FIGS. 7 and 8. Movement of the clamping device 10 between its left and right positions is guided by the projections 33 fitting in the guiding grooves 18. Once the clamping device 10 is installed on a phonograph, it is fairly difficult for an inexperienced person, such as a customer, to remove the clamping device 10. This is because the projections 33 fitting in the depressions 16a, 16b, 17a, 17b or in the grooves 18 make it fairly difficult to rotate the clamping device 10 to a position where it can be removed. Hence, even though our clamping device 10 is easy to install and operate, its relative difficulty of removal by an inexperienced person protects people from contacting any live electrical terminals beneath the unit plate 26.

It will thus be seen that our invention provides a new and improved clamping device which is particularly useful where two plates, such as in a phonograph, are to be held in one of two positions. One position is a relatively firm or clamped position, and the other position is a relatively free but retained position. Our clamping device is relatively simple in construction, but we have found that it provides positive and reliable operation in the carrying or clamped position, and in the playing or using position. Our clamping device may be inserted into the phonograph prior to shipment, and permits the phonograph to be shipped with a threaded or screwed connection as shown in FIG. 6. When the phonograph is to be used, this threaded or screwed connection may be removed, and our clamping device utilized for clamping or for retaining. Since our clamping device is relatively simple in construction it may be produced in large quantities, and hence is relatively inexpensive. However, our clamping device is sufficiently reliable and positive in operation that it meets the requirements of various underwriter laboratories. While we have shown only one embodiment of our invention, persons skilled in the art will appreciate that modifications may be made. For example, the relative angles of direction of the actuator 14, the retaining surfaces 19a, and the clamping surfaces 21a may be varied, depending upon the exact arrangement of the openings in the two plates. However, we prefer that the lower surface 14b of the actuator 14 and that the retaining surfaces 19a and the clamping surfaces 21a be generally parallel to each other and perpendicular to the longitudinal axis of the shank 11. The clamping device 10 may be provided with rigid members beneath the arms 23 to limit the amount the arms 23 can be bent. The exact configuration of the clamping device 10 in order to provide the retaining surfaces 19a and the clamping or carrying surfaces 21a may be varied, depending upon the desired appearance of the clamping device. Thus, the two support legs for the retaining member 19 may be replaced by a single extension of the shank 11. And, while we prefer an integral clamping device 10, it may be assembled from component parts. The hole 31 in the motorboard 27 may have various shapes as long as a wide portion 31a and a narrow portion 31b are provided. Therefore, while our invention has been described with reference to a particular embodiment, it is to be understood that modifications may be made without departing from the spirit of the invention or from the scope of the claims.

What we claim as new and desire to secure by Letters Patent of the United States is:

1. A device for clamping a first plate and a second plate together with one of two selected spacings defining a first and a second position of said plates relatively to each other, comprising:

(a) an elongated shank having a top, a bottom, and a longitudinal axis;

(b) an actuator attached to said shank at said top, said actuator having a surface that faces said bottom for contacting said first plate, said surface lying in a plane that is substantially perpendicular to said longitudinal axis and that extends along a first line in opposite directions from said shank;

(c) a clamping member attached to said shank between said top and said bottom, said clamping member having a clamping surface that faces said top for contacting said second plate to define a first position between said first and second plates, said clamping surface lying in a plane that is substantially perpendicular to said longitudinal axis, and that extends along a second line in opposite directions from said shank;

(d) and a retaining member for holding said first and second plates in a second position relative to each other and attached to said shank at said bottom, said retaining member having a retaining surface that faces said top and is operatively engageable with said second plate, said retaining surface lying in a plane that is substantially perpendicular to said longitudinal axis and that extends along a third line in opposite directions from said shank beyond said clamping surface.

2. The clamping device of claim 1 wherein said second and third lines are substantially parallel to each other and are substantially perpendicular to said first line.

3. The clamping device of claim 2 wherein said actuator is provided with spaced depressions in said flat surface thereof to provide a detent mechanism with projections in one of said plates.

4. The clamping device of claim 3 wherein said clamping device is formed of an integral piece of plastic material.

5. The clamping device of claim 2 wherein said shank is provided with resilient clamping arms that extend upward toward said actuator.

6. For use in joining two plates, on having an elongated opening and one having an opening with a wide portion and a narrow portion, an improved clamping device comprising:
 (a) an elongated shank having a longitudinal axis;
 (b) an actuator positioned at the top of said shank, said actuator having a downwardly facing flat surface lying in a plane positioned at right angles to said longitudinal axis, said flat surface extending in opposite directions from said longitudinal axis along a first line;
 (c) a retaining member positioned at the bottom of said shank, said retaining member being wider than said wide portion of said opening and having two upwardly facing flat surfaces lying in a plane positioned at right angles to said longitudinal axis, said retaining surfaces extending in opposite directions for first distances from said longitudinal axis along a second line that is substantially perpendicular to said first line;
 (d) and a clamping member positioned between said top and bottom of said shank, said clamping member being wider than said narrow portion of said opening and having two upwardly facing flat surfaces lying in a plane positioned at right angles to said longitudinal axis, said clamping surfaces extending in opposite directions for second distances from said longitudinal axis along a third line that is substantially perpendicular to said first line, said second distances being less than said first distances.

7. The clamping device of claim 6 wherein said actuator is provided with spaced depressions in said flat surface thereof to provide a detent mechanism with projections in one of said plates.

8. The clamping device of claim 6 wherein said shank is provided with resilient clamping arms that extend upward toward said actuator.

9. The clamping device of claim 8 wherein said actuator is provided with spaced depressions in said flat surface thereof to provide a detent mechanism with projections in one of said plates.

10. The clamping device of claim 9 wherein said clamping device is formed of an integral piece of plastic material.

11. An improved phonograph arrangement comprising:
 (a) a motorboard having at least one irregular opening having a wide portion and a narrow portion;
 (b) a unit plate supported on said motorboard by a plurality of springs, said unit plate having an elongated opening positioned above said irregular opening;
 (c) at least one spacer mounted against lateral movement on the upper surface of said motorboard and adapted to engage a mating member in the lower surface of said unit plate.
 (d) and a clamping member positioned on said phonograph arrangement, said clamping member having an actuator positioned on the upper surface of said unit plate over said elongated opening, an elongated shank extending downward from said actuator through said elongated opening and said irregular opening, a clamping member extending in opposite directions from said shank beneath the lower surface of said motorboard, and a retaining member extending in opposite directions from said shank beneath said clamping member, said clamping member being wider than said narrow portion of said irregular opening and said retaining member being wider than said wide portion of said irregular opening whereby said unit plate can be clamped to said motorboard between said actuator and said clamping member and can be retained on said motorboard between said actuator and said retaining member.

12. The improved arrangement of claim 11 wherein said unit plate comprises upwardly facing projections, and wherein said actuator comprises recesses in its lower surface for engaging said upwardly facing projections and guiding said actuator along a straight line.

13. The assembly of claim 11 with third means for holding said two members in a locked position by movement of said first means from said accessible surface.

14. The assembly of claim 11 with said first means being insertable through said first member and said second member and having a surface portion for engaging the lower side of said second member, said first means being positionable to engage said surface portion with the lower surface of said second member thereby preventing removal of said first means from said first and second members when in such position, said first means slidable in a first direction to release said second member when in such position but not releasable from said first member when in such position.

15. The assembly of claim 14 with a passage in said second member through which said first means is inserted, said passage having first and second coplanar openings with said first opening being of a larger dimension than said second opening, said first means having a first shoulder comprising said surface portion and a second shoulder, said first shoulder having a dimension greater than said first and second openings and said second shoulder having a dimension greater than said second opening but less than said first opening so that said second shoulder will engage said second opening but not said first opening when in such position.

16. The assembly of claim 14 with said second means comprising resilient ears on said first means for engaging the nonaccessible side of said first member when said first means is in such position to hold said first means to said first member.

17. A mounting assembly comprising:
 (a) a first member having an accessible surface;
 (b) a second member which normally is non-accessible;
 (c) first means mountable to the first member and attachable to the second member for holding the two members in a free floating relationship having predetermined limits of movement relative one another;
 (d) said first means capable of releasing and disassembling the two members from each other by manipulation exclusively from the accessible surface;
 (e) said first means, including the portion attachable to the second member, being movable, relatively to both of said members and in one position holding said members in said free floating relationship and in a second position releasing said members from one another for disassembly; and
 (f) second means for resiliently holding said first means to one of said members when said first means is in said one position.

18. In the mounting assembly according to claim 17, said first means having a portion attachable to said second member and being integrally constructed and moveable together with said first means by manipulation.

References Cited

UNITED STATES PATENTS

| | | | | |
|---|---|---|---|---|
| 1,026,772 | 5/1912 | Ries | | 24—221 |
| 2,260,048 | 10/1941 | Newell | | 24—221 |
| 2,990,598 | 7/1961 | Gaylord | | 24—221 |
| 3,063,664 | 11/1962 | Vazzano | | 248—20 |
| 3,124,993 | 3/1964 | Schlueter | | 24—221 X |
| 3,136,017 | 6/1964 | Preziosi | | 24—221 |
| 3,220,078 | 11/1965 | Preziosi | | 24—221 |

STEPHEN T. NOVOSAD, Primary Examiner

U.S. Cl. X.R.

248—20

PO-1050
(5/69)

UNITED STATES PATENT OFFICE
CERTIFICATE OF CORRECTION

Patent No. 3,540,088      Dated November 17, 1970

Inventor(s) R. W. Simpson and Carl R. Hart

It is certified that error appears in the above-identified patent and that said Letters Patent are hereby corrected as shown below:

Column 1, line 25, "a" omitted between "to" and "clamp

Column 4, line 32, "31b'" should be -- 31b --.

Column 6, line 54, "a" second occurrence, should be do

Column 7, line 75, the period should be a semicolon.

Column 8, line 1, "member" should be -- means --.

Column 8, line 2, "member" should be -- means --.

Column 8, line 24, "11" should be -- 17 --.

Column 8, line 27, "11" should be -- 17 --.

Signed and sealed this 20th day of April 1971.

(SEAL)
Attest:

EDWARD M. FLETCHER, JR.
Attesting Officer

WILLIAM E. SCHUYLER, JR
Commissioner of Patents